United States Patent [19]

Daly et al.

[11] 4,097,236

[45] Jun. 27, 1978

[54] METHOD OF DETECTING HEAT SEAL BREAKS AND PACKAGE THEREOF

[75] Inventors: William P. Daly, White Plains, N.Y.; Robert P. Lewis, Oceanport, N.J.; Oliver L. Pouliot, Oradell, N.Y.

[73] Assignee: Faser Industries, Saddle Brook, N.J.

[21] Appl. No.: 762,066

[22] Filed: Jan. 24, 1977

[51] Int. Cl.² ............... B65D 73/00; G01M 3/00; G01N 19/08

[52] U.S. Cl. .................. 23/230 L; 73/49.8; 206/459

[58] Field of Search ......... 23/230 L, 253 TP; 73/49.3, 49.8; 206/459

[56] References Cited

U.S. PATENT DOCUMENTS 3,533,548  10/1970  Taterka ............... 206/459 X
3,568,627  3/1971  Selinger et al. ......... 23/253 TP X
3,616,898  11/1971  Massie ................. 206/459 X

*Primary Examiner*—Robert M. Reese
*Attorney, Agent, or Firm*—Burgess, Dinklage & Sprung

[57] ABSTRACT

Breaks in heat seals between a paper member and a clear plastic member are detected by providing a paper member with a relatively dark coloration, for example dark blue, dark green or dark red, at least in the area of the heat seal, heat sealing the clear plastic member to the paper member in the desired seal area whereby upon breaking the heat seal there is a distinct color contrast between the break in the heat seal and the relatively dark coloration of the paper and any remaining heat sealed area. The method is especially suited for the manufacture of sterilizable packages or pouches for medical implements.

6 Claims, 5 Drawing Figures

U.S. Patent    June 27, 1978    4,097,236
FIG. I.
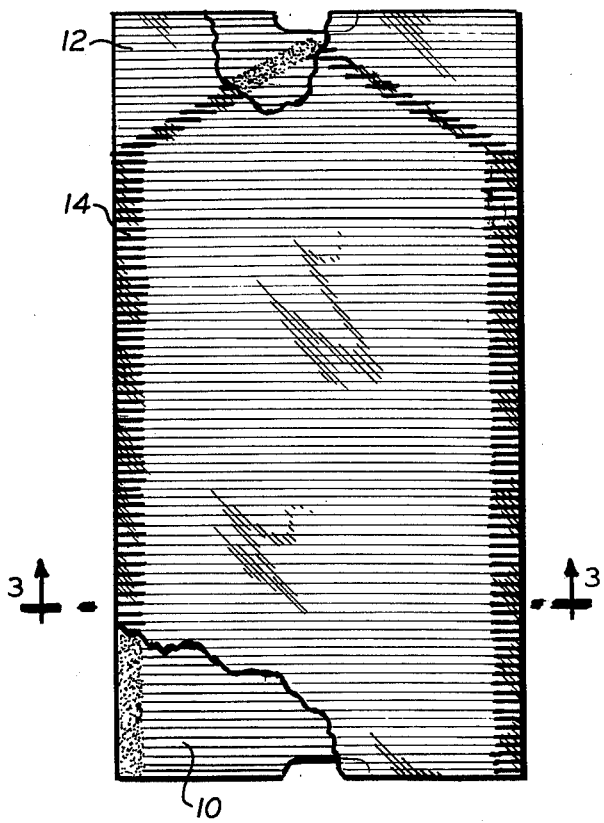
FIG. 2.
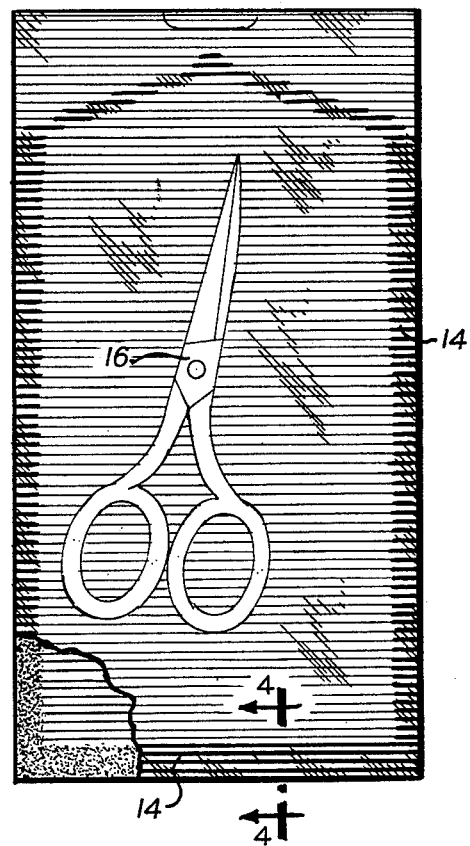
FIG. 3.
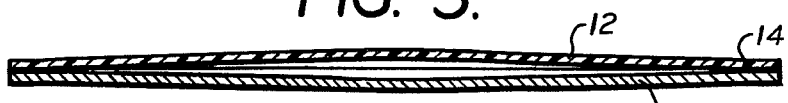
FIG. 4.
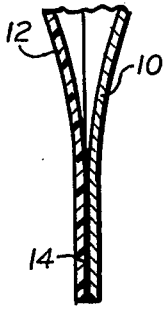
FIG. 5.
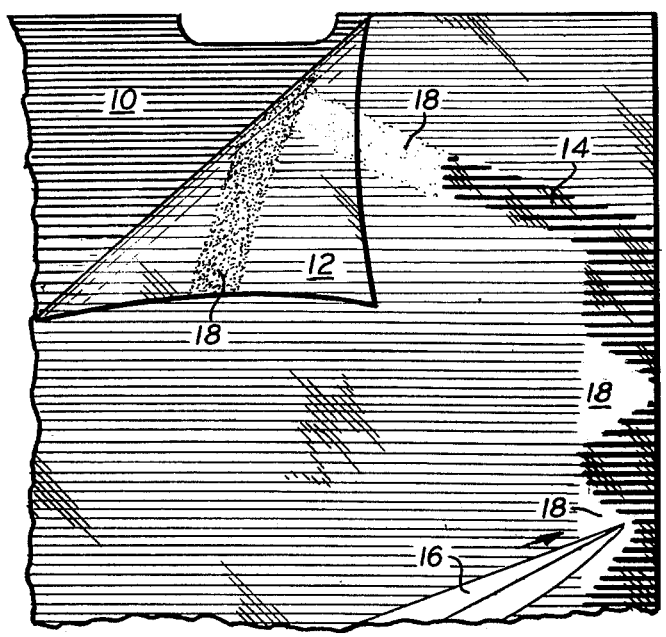

METHOD OF DETECTING HEAT SEAL BREAKS AND PACKAGE THEREOF

BACKGROUND

This invention relates to a method of detecting breaks in heat seals between paper and plastic, especially in sterile packages.

Sterilizable packages or pouches made by marginally heat sealing a clear plastic laminate to surgical grade kraft paper or the like have come into widespread use. The paper portion of such packages is designed to be sufficiently porous to permit gas or steam sterilization but is impervious to bacteria. The plastic laminate is heat sealable to the paper, stable under sterilization conditions, impervious to bacteria and permits visual identification of the package contents. Indicator inks that change color upon sterilization (gas or steam) are typically printed on the exterior, paper side of the package.

Such packages are used for medical implements that must be sterile prior to use. The manufacturer or user (such as a hospital or clinic) of such medical implements is supplied with a package heat sealed around three sides by the package manufacturer. The medical implement is then placed in the package and the fourth side is heat sealed to complete the marginal seal between the paper and the plastic.

After sterilization, either by exposure to ethylene oxide gas or by steam autoclaving, by the medical implement manufacturer or by the hospital or clinic, the package and its sterile contents can be stored for indefinite periods of time in a sterile condition.

Prior to use, for example in an operating room, the marginal heat seal of the package is visually inspected in an effort to detect whether or not the initial heat seal is adequate or whether or not there are any subsequent breaks or ruptures in the heat seal, for example by accidental tampering with the package after sterilization or by shifting of the package contents in such a way that the heat seal becomes broken or ruptured.

Sterilization pouches are conventionally made of clear, colorless plastic film heat sealed to white paper. This combination of materials makes it extremely difficult, if not impossible, to visually determine if the initial seal has subsequently been ruptured or broken by tampering or movement of the package contents.

To more readily ascertain the validity of the initial heat seal, it has been proposed to lightly tint the plastic laminate member or to coat the paper member with a lightly tinted heat seal coating. This approach, however, has been far from satisfactory in that it is not possible to readily ascertain by visual inspection the adequacy and completeness of the initial heat seal between the plastic film and the paper member. Moreover, there is no improvement as compared to white paper and colorless plastic film as regards subsequent breaks or ruptures in the heat seal between the plastic and the paper due to tampering with the package or movement of the contents of the package.

SUMMARY

The present invention provides a method and a package, especially for sterilization pouches, which overcomes the problems heretofore encountered in a simple, effective and reliable fashion.

The method of the invention for detecting a break or rupture in a heat seal between a paper member and a clear plastic member involves providing a paper member with a relatively dark coloration, at least in the area of the heat seal, heat sealing the clear plastic member to the paper member in the desired seal area whereby upon breaking of the heat seal, there is a distinct color contrast between the break in the heat seal and the relatively dark coloration of the paper and any remaining heat sealed area.

The invention also provides a package which is especially useful as a sterilization pouch wherein breaks or ruptures in the heat seal due to either tampering with the package or movement of the package contents can be readily detected visually by the user of the package contents just prior to use.

DESCRIPTION OF THE DRAWINGS

The present invention will be more fully understood from the following description taken in conjunction with the accompanying drawing wherein:

FIG. 1 is a top plan view partly broken away of a sterilization package or pouch according to the invention marginally heat sealed around three sides of the package and shaded to indicate that the paper member is dark blue;

FIG. 2 is a top plan view of the sterilization pouch shown in FIG. 1 heat sealed marginally along the fourth side of the package to enclose the package contents which, in this instance, is a pair of scissors;

FIG. 3 is a sectional view taken along line 3—3 of FIG. 1;

FIG. 4 is a sectional view partly broken away taken along line 4—4 of FIG. 2; and FIG. 5 is a top plan view partly broken away of a sterilization pouch according to the invention illustrating various ways in which breaks or ruptures in a heat seal can occur.

DESCRIPTION

The preferred embodiment of a sterilization pouch shown in FIG. 1 and 2 of the drawing is shown to include a paper member 10 having a dark coloration (in this illustration, dark blue) and a clear plastic laminate 12 which is marginally heat sealed around three sides of the package in FIG. 1 and around the fourth side of the package in FIG. 2 to complete the marginal heat seal 14. The chevron configuration at the top of the package is used to facilitate manual opening or peeling apart of the package to gain access to the package contents which is shown in FIG. 2, for illustrative purposes, as a pair of scissors 16.

The paper member 10 can be conveniently dyed or tinted the desired relatively dark color, for example dark blue, dark green, dark red, dark brown, dark grey, or black. Instead of dyeing or tinting the paper member 10, the paper member can have a relatively dark coating applied thereto, at least in the heat seal area. This can readily be accomplished by overprinting all or only the seal area of the paper member 10 with a dark ink such as the dark colors enumerated previously. The dye, tint or ink should be selected so as to be stable under sterilization conditions.

Readily available surgical grade kraft paper having the desired porosity characteristics can be readily dyed or overprinted to provide the desired relatively dark coloration for the paper member 10.

The term "paper" as used herein also applies to synthetic or artificial paper materials made from plastic fibers and the like, as well as conventional paper products having the necessary characteristics for use in sterilization pouches. An example of synthetic paper is a spun bonded polyethylene sold by DuPont under the trademark "TYVEK".

The plastic member 12 is preferably a laminate of a polyester, such as polyethylene terephthalate sold under the trademark "MYLAR", and a heat sealable thermoplastic material such as polyethylene, polypropylene, ethylene vinyl acetate, an ionomer such as DuPont's "SURLYN", copolymers and mixtures of the foregoing. The polyester layer forms the exterior of the package and the heat sealable thermoplastic material interfaces with the paper member 10 and forms the marginal heat seal 14.

Heat sealing the plastic member 12 to the paper member 10 around the margin of the package as shown in FIGS. 1 and 2 of the drawing can be accomplished using conventional heat sealing equipment and techniques. Generally, the heat seal is made wide enough to guarantee an adequate and complete seal around the margin of the package initially formed with a heat seal around the three sides with the fourth side completed after the package contents are inserted therein. See FIG. 2.

Indicator inks that change color upon sterilization, either gas or steam autoclaving, can be printed on either side of the paper portion of the package. These indicator inks are readily available in a variety of colors and should be chosen so as to be visually detectable against the paper background, both before and after sterilization. If desired, a white area or block can be printed on the back of the paper member 10 and the indicator inks printed in this area.

According to the invention, the plastic member 12 exhibits a relatively translucent appearance which can be described as cloudy or milky as compared to the clear member itself, upon rupture or breaking of the heat seal area 14. This cloudy or milky appearance is believed to result from the heat sealing operation and only comes into being when the heat seal is ruptured or broken. This phenomenon is believed to result from a surface conformation by the plastic member 12 to the surface of the paper member 10. The paper member 10 usually has a dull or matte finish and this is duplicated in the seal area of the film in a cloudy or milky appearance upon rupture or breaking of the heat seal 14.

FIG. 5 of the drawing is intended to illustrate how the present invention provides a visual contrast for readily detecting breaks or ruptures in the heat seal between the paper member 10 and the plastic member 12, whether due to partial opening of the package, either intentionally or unintentionally, or by shifting of the package contents. In FIG. 5 the plastic member 12 is shown pulled back and separated from the chevron portion of the heat seal area 14. The left side of the figure shows the cloudy or milky appearance 18 from the heat seal side of the plastic member 12, whereas the right side of the figure shows the contrast that results from the exterior side of the plastic film 12. Note especially the marked contrast of the broken heat seal area 18 with respect to the dark coloration of the paper member 10 itself and the remaining sealed area 14. It should also be noted that the sealed area 14 has a glossy, clear appearance which is in contrast to the dull or matte finish appearance of the paper member 10 through the plastic member 12 outside of the seal area 14. This contrast can be used to detect voids or defects in the heat seals made by the package manufacturer and also the packager.

Also illustrated in FIG. 5 is the visual contrast that results when the package contents such as the pointed end of scissors 16 shifts and pierces or ruptures the heat seal 14. As can be seen, this results in a readily discernible translucent appearance 18 which is in distinct color contrast with the dark coloration of the paper member 10 through the plastic member 12 in the unsealed areas of the package and is also in distinct color contrast with the remaining heat sealed area 14 which shows the coloration of the paper member 10 in a clear and glossy fashion. Thus, in the case of a dark blue paper member 10, the user of a sterilized package such as shown in FIG. 2 can readily determine by a simple visual examination if the package, after sterilization, has been opened, either intentionally or unintentionally, that is, by peeling apart the two member 10 and 12 or whether the package contents, such as the scissors 16 has shifted and pierced or ruptured the heat seal 14. In either instance, the translucent portion 18 which has a cloudy or milky appearance is in distinct color contrast with the dark coloration of the paper member 10 itself, which in this case is dark blue, and the remaining heat sealed area which has a clear, dark blue coloration, but is glossy in appearance as compared to the matte or dull finish of the paper member 10 itself outside the seal area.

The same, highly visual color contrast results from imparting to the paper member 10 a relatively dark coloration such as dark blue, dark green, dark red, dark brown, dark grey, or black.

What is claimed is:

1. Method of detecting a break in a heat seal between a paper member and a clear plastic member in a sterilizable package which comprises providing a paper member dyed a dark color which is sufficiently porous to permit gas or steam sterilization but is impervious to bacteria, heat sealing the clear plastic member directly to the dyed paper member in the desired heat seal area, thereafter visually examining the heat seal to detect if the previously clear plastic member takes on a translucent appearance in the area of the heat seal which translucent appearance provides a distinct color contrast and indicates a broken seal.

2. Sterilizable package comprising a clear plastic member heat sealed directly to a paper member which is sufficiently porous to permit gas or steam sterilization but is impervious to bacteria, said paper member being dyed a dark color such that upon breaking the heat seal the previously clear plastic member takes on a translucent appearance in the area of the broken seal which provides a distinct color contrast between the break in the heat seal and the dark color of the paper in any remaining heat sealed area.

3. Sterilizable package of claim 2 wherein the paper member is surgical grade kraft paper.

4. Sterilizable package of claim 2 wherein the plastic member is a laminate of a polyester and a heat sealable thermoplastic material.

5. Sterilizable package of claim 2 wherein the paper member bears indicia that changes color upon sterilization.

6. Sterilizable package comprising a clear plastic laminate of a polyester and a heat sealable thermoplastic marginally heat sealed to surgical grade kraft paper dyed a dark color which is sufficiently porous to permit gas or steam sterilization but is impervious to bacteria such that upon breaking the heat seal the previously clear plastic member takes on a translucent appearance in the area of the broken seal which provides a distinct color contrast between the break in the heat seal and the dark color of the paper and any remaining heat sealed area.

* * * * *